Oct. 11, 1955 R. E. SELTZER 2,720,159
BALE MEASURING DEVICE FOR BALING MACHINE
Filed June 8, 1953 2 Sheets-Sheet 1
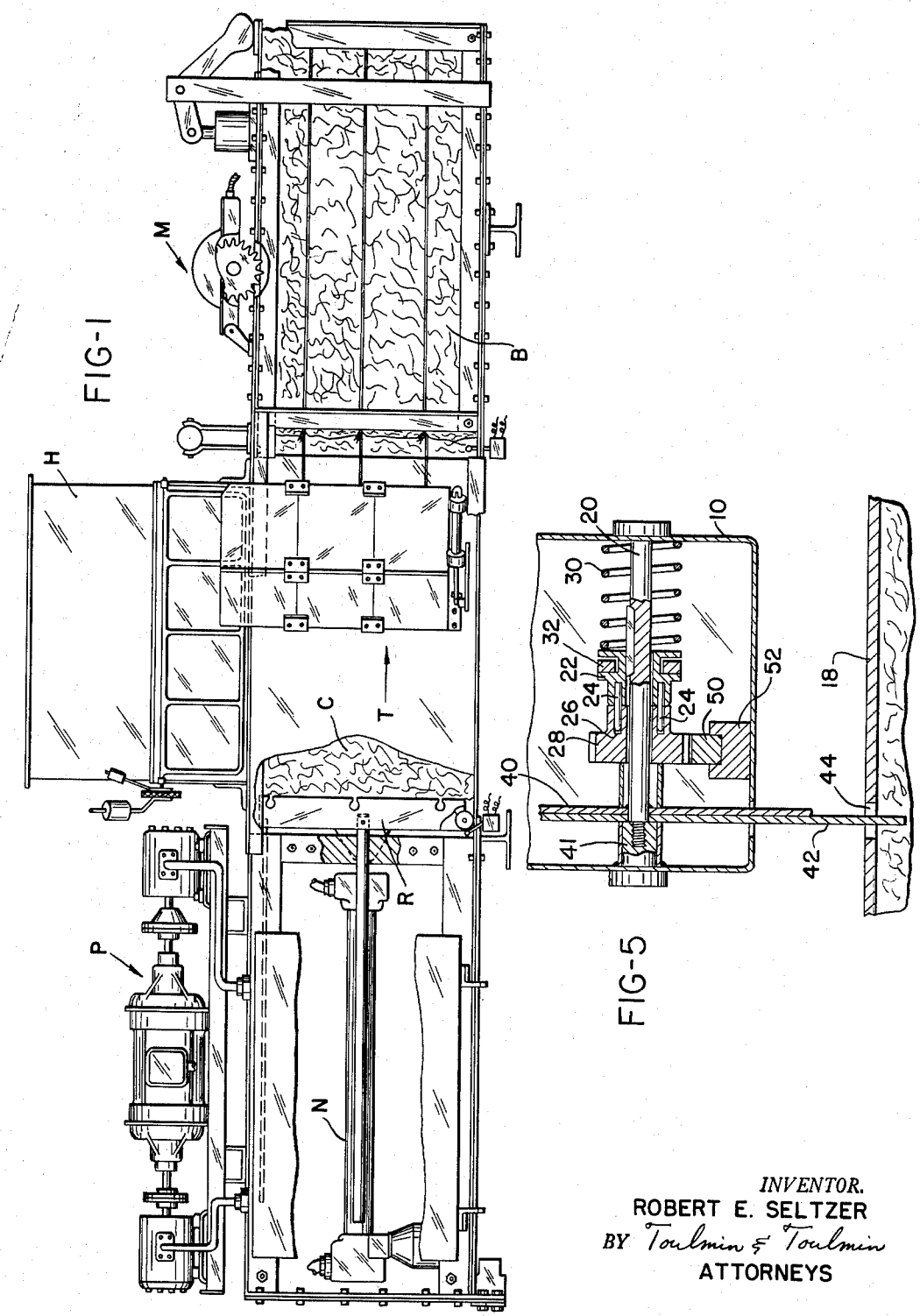
INVENTOR.
ROBERT E. SELTZER
BY Toulmin & Toulmin
ATTORNEYS Oct. 11, 1955　　　　R. E. SELTZER　　　2,720,159
BALE MEASURING DEVICE FOR BALING MACHINE
Filed June 8, 1953
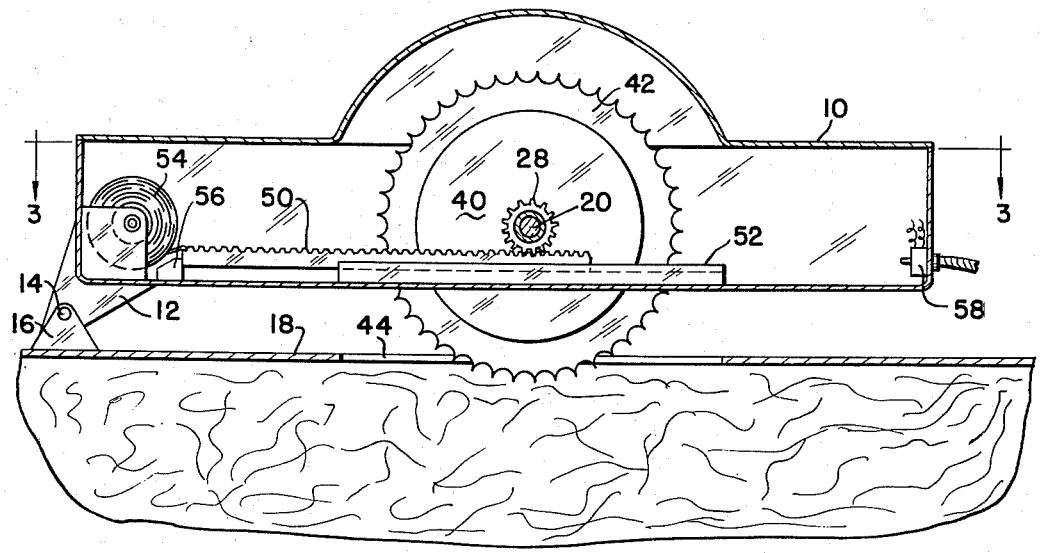
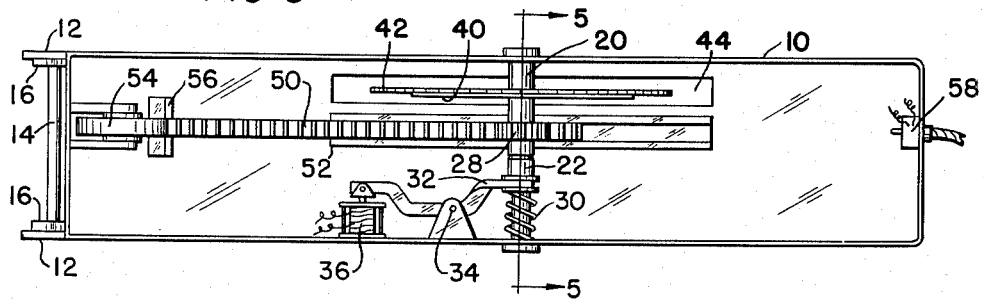
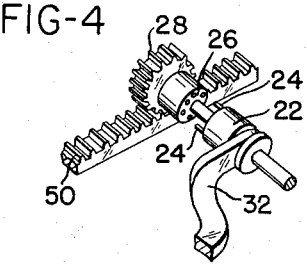
INVENTOR.
ROBERT E. SELTZER
BY Toulmin & Toulmin
ATTORNEYS

United States Patent Office 2,720,159
Patented Oct. 11, 1955

2,720,159

BALE MEASURING DEVICE FOR BALING MACHINE

Robert E. Seltzer, Bellevue, Ohio, assignor to The American Baler Company, Bellevue, Ohio, a corporation of Ohio Application June 8, 1953, Serial No. 360,088

3 Claims. (Cl. 100—4)

This invention relates to baling machines and, in particular, to a novel arrangement for use in connection with baling machines for automatically measuring the length of the bale being formed and initiating banding cycles so that bales of a predetermined size are automatically formed during operation of the baling machine. This application is a continuation-in-part of my co-pending application Serial No. 282,429, filed April 15, 1952.

In the co-pending application referred to above, I show a full automatic baling machine particularly adapted for industrial use in the baling of wastes and the like, and in which the material to be baled is delivered to a compression chamber from a chute or hopper, and is pushed from the compression chamber into a baling chamber where it is pressed into the form of a bale during its travel therethrough. Such a machine is advantageously provided with an automatic banding mechanism for automatically passing wires about the bales for binding the bales into an integral form to permit storage and transport thereof.

The present application deals in particular with a novel mechanism which is provided for initiating the operation of the automatic banding mechanism whenever a bale being built up reaches a predetermined size.

A primary object of the present invention is the provision of a novel arrangement for effecting accurate measurement of the length of the bale being made and, in response to detecting a predetermined length of bale, initiating operation of an automatic banding mechanism.

A still further object is the provision of a bale measuring device for a baling machine which can readily be made selectively operable or inoperable.

A still further object of this invention is the provision of a bale measuring mechanism of the nature described adapted for being incorporated in substantially any conventional baling device with practically no change in the baling machine structure.

These objects will become more apparent upon reference to the following specification taken in connection with the accompanying drawings, in which:

Figure 1 is a side elevational view of an automatic baling machine, with parts broken away, embodying a bale measuring mechanism according to this invention;

Figure 2 is an enlarged vertical sectional view taken through the bale measuring mechanism;

Figure 3 is a plan sectional view through the bale measuring mechanism indicated by line 3—3 on Figure 2;

Figure 4 is a fragmentary perspective view showing the clutch mechanism forming a part of the bale measuring mechanism;

Figure 5 is a vertical sectional view indicated by line 5—5 on Figure 3.

The general arrangement of a baling machine adapted for having incorporated therewith a bale measuring mechanism according to the present invention is illustrated in Figure 1, wherein a hopper or chute H supplies material to be baled to compression chamber C, whence it is pressed by the ram or baling head R into a baling chamber B and wherein it takes the form of a bale which is banded by banding wires, and which wires are twisted together and cut off by a twister and cut off unit generally indicated at T.

The ram or baling head R is adapted for being driven by a hydraulic motor N supplied by fluid under pressure by a hydraulic power unit P.

The bales being formed are pushed through the baling chamber beneath a measuring mechanism according to this invention which is generally indicated at M and which serves automatically to measure the length of the bale being formed and to initiate a banding operation when the bale reaches a predetermined length, and which banding operation consists of thrusting banding wires across the back of the bales and twisting them together at one corner of the bale, cutting the wires off, and tucking the raw ends of the wires into the corners of the bale.

The details of construction of the banding and wire twisting mechanism are more fully disclosed in my parent applictaion referred to above, as well as the details in connection with the hydraulic and electrical control system by means of which the operation of the baling machine is controlled.

Referring now more particularly to Figures 2 through 5, the automatic bale measuring mechanism according to the present invention is illustrated somewhat more in detail.

The bale measuring mechanism comprises a frame or housing 10 having a dependent portion 12 which receives a pivot 14 that passes through the upstanding lug means 16 on the top wall 18 of the baling chamber.

Intermediate the ends of housing 10 there is rotatably supported a shaft 20 and to which shaft there is slidably keyed a clutch part 22 having pins 24 adapted for registering with an entering axial holes 26 in the hub of a gear 28 that is rotatably supported by shaft 20.

A compression spring 30 continuously urges clutch part 22 toward gear 28 so that normally the pins 24 are engaged with the hub of gear 28 so that the said gear is drivingly connected with shaft 20.

As will best be seen in Figure 3, clutch member 22 is provided with an annular groove which receives one end of a shifter fork 32 pivoted at 34 and adapted for being rotated about the said pivot by a solenoid-armature arrangement 36. Energization of the solenoid of the solenoid-armature arrangement will rotate shifter fork 32 clockwise about pivot 34, as it is viewed in Figure 3, and this will serve to disengage clutch part 22 from the hub of gear 28.

On the opposite side of gear 28 from clutch part 22, shaft 20 has rigidly attached thereto a plate 40 and mounted against plate 40 in a detachable manner by means of a threaded member 41 is a wheel 42 having a notched, serrated, or toothed periphery.

Wheel 42 extends through aperture 44 provided in top plate 18 of the baling chamber and bears on the upper surface of the bale being formed in the baling chamber. It will be evident that movement of the bale through the baling chamber will rotate wheel 42 and with it plate 40, shaft 20, and clutch part 22. If clutch part 22 is drivingly connected with gear 28, then gear 28 will also be rotated.

Gear 28 is arranged to mesh with a rack 50 that is guided for rectilinear movement in housing 10 by a guide means 52.

As will best be seen in Figures 2 and 3, rack 50 is connected at one end with a spiral spring means 54 so that it is continuously biased leftwardly in Figures 1 and 2, and which is opposite to the direction that the rack will move when the bale measuring mechanism is actuated by movement of a bale through the baling chamber.

A stop means 56 in housing 10 determines the extreme leftward position of rack 50, while at the right end of housing 10, as it is viewed in Figures 2 and 3, there is a limit switch 58 adapted for engagement and actuation by the end of rack 50 when it reaches its extreme right-hand position.

Limit switch 58 is connected in circuit with the electric control means which initiates the banding and tieing operation and it will, accordingly, be apparent that, commencing with the rack 50 in its Figure 2 position, whenever a predetermined length of bale has passed beneath the bale measuring mechanism, the limit switch 58 will be actuated and initiate a banding and tieing operation.

The control system for controlling the banding and tieing operation also includes means for energizing the solenoid of the solenoid-armature arrangement 36 so that, toward the completion of the banding and tieing operation, or before the baler again commences to operate to build up another bale, the said solenoid will be energized to disengage clutch part 22 from the hub of gear 28, and this will release rack 50 under the influence of spring means 54 which will return the rack to its left hand or starting position.

The measuring mechanism according to this invention can be incorporated in substantially any baling device with a minimum of modification of the baling device and, further, the measuring mechanism can readily be made inoperable merely by tilting it upwardly about its pivotal connection with the baling machine.

The measuring device is entirely self contained and does not add to the complexity of the baling machine in any way whatsoever.

It will be understood that this invention is susceptible to modification in order to adapt it to different usages and conditions, and, accordingly, it is desired to comprehend such modifications within this invention as may fall within the scope of the appended claims.

I claim:

1. In a bale measuring device of the nature described; a housing adapted for pivotal connection with a wall of a baling chamber, a shaft rotatably mounted in said housing, a first plate rigidly affixed to said shaft, means detachably mounted on said first plate and having its periphery engaging a bale in said baling chamber so that movement of said bale will rotate said plate and shaft, a clutch part slidably keyed to said shaft, a gear rotatable on said shaft engageable with said clutch part to drivingly connect said gear with said shaft, a rack reciprocably guided in said housing and meshing with said gear, spring means biasing said rack in a direction opposite to the direction in which it is driven when the shaft is turned by movement of a bale in said chamber, and a control element in said housing positioned to be engaged by said rack in response to a predetermined amount of movement thereof in a direction opposite to which it is biased by said spring means.

2. A bale measuring device as called for in claim 1 including electrical means operable for controlling the connection of said clutch part and gear.

3. A bale measuring device according to claim 2 in which spring means are provided normally urging said clutch part into driving engagement with said gear while said electrical means is energizable for disengaging said clutch part from said gear.

References Cited in the file of this patent

UNITED STATES PATENTS

| 894,876 | Clark | Aug. 4, 1908 |
| 1,236,751 | Paddeck | Aug. 14, 1917 |
| 2,331,818 | Wallace | Oct. 12, 1943 |
| 2,619,027 | Sykes | Nov. 25, 1952 |
| 2,624,270 | Sykes | Jan. 6, 1953 |
| 2,630,750 | Eberle | Mar. 10, 1953 |

FOREIGN PATENTS

| 37,894 | Denmark | Sept. 5, 1927 |
| 226,378 | Germany | Oct. 5, 1910 |
| 850,199 | France | Sept. 4, 1939 |